United States Patent
Hartig et al.

(10) Patent No.: US 9,365,276 B2
(45) Date of Patent: Jun. 14, 2016

(54) DRIVE CASCADE SYSTEM FOR A WATERCRAFT

(71) Applicant: Siemens Aktiengesellschaft, München (DE)

(72) Inventors: Rainer Hartig, Buxtehude (DE); Dierk Schröder, Selent (DE); Kay Tigges, Hamburg (DE); Michael Wycisk, Moenkeberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/824,139

(22) Filed: Aug. 12, 2015

(65) Prior Publication Data

US 2015/0344117 A1 Dec. 3, 2015

Related U.S. Application Data

(62) Division of application No. 14/382,916, filed as application No. PCT/EP2013/054611 on Mar. 7, 2013, now Pat. No. 9,199,711.

(30) Foreign Application Priority Data

Mar. 12, 2012 (DE) .......................... 10 2012 203 820

(51) Int. Cl.
 *B63H 21/17* (2006.01)
 *B63H 21/20* (2006.01)
 (Continued)

(52) U.S. Cl.
 CPC .............. *B63H 21/20* (2013.01); *B60L 11/08* (2013.01); *B63H 1/04* (2013.01); *B63H 5/07* (2013.01);
 (Continued)

(58) Field of Classification Search
 CPC ........ B63H 23/24; B63H 23/28; B63H 21/20; B63H 21/14; B63H 21/17; B63H 21/21

USPC .............................................. 440/6
See application file for complete search history.

(56) References Cited

U.S. PATENT DOCUMENTS 6,597,082 B1 7/2003 Howard et al.
7,353,764 B2 4/2008 Rzadki et al.
(Continued)

FOREIGN PATENT DOCUMENTS

CN 101932469 A 12/2010
CN 102120488 A 7/2011
(Continued)

OTHER PUBLICATIONS

International Search Report PCT/ISA/210 for International Application No. PCT/EP2013/054611 Dated May 31, 2013.
(Continued)

*Primary Examiner* — Stephen Avila
(74) *Attorney, Agent, or Firm* — Harness, Dickey & Pierce, P.L.C.

(57) ABSTRACT

A watercraft and controller are disclosed. An embodiment includes a controller for the water craft being configured to operate at least one drive propeller of the drive system of the watercraft below a first propeller rotational speed according to a first operating state by operating at least one drive motor, connected to the at least one drive propeller, via a first alternating voltage; and operate the at least one drive propeller above the first propeller rotational speed according to a second operating state by operating the at least one drive motor via a second alternating voltage. In a transition from the first into the second operating state or vice versa, the first internal combustion engine is operated at such a rotational speed that the at least one drive propeller is driven at the first propeller rotational speed, and the first alternating voltage is synchronized with the second alternating voltage.

14 Claims, 2 Drawing Sheets

(51) Int. Cl.
*B63H 21/14* (2006.01)
*B63H 5/08* (2006.01)
*F02D 29/02* (2006.01)
*B60L 11/08* (2006.01)
*B63H 23/24* (2006.01)
*B63H 1/04* (2006.01)
*B63H 5/07* (2006.01)
*B63H 21/21* (2006.01)
*H02J 3/38* (2006.01)
*H02J 3/46* (2006.01)

(52) U.S. Cl.
CPC .................. *B63H 5/08* (2013.01); *B63H 21/14* (2013.01); *B63H 21/17* (2013.01); *B63H 21/21* (2013.01); *B63H 23/24* (2013.01); *F02D 29/02* (2013.01); *H02J 3/38* (2013.01); *H02J 3/46* (2013.01); *B63H 2021/205* (2013.01); *Y02E 60/721* (2013.01); *Y02T 10/70* (2013.01); *Y02T 10/7077* (2013.01); *Y02T 70/5236* (2013.01); *Y04S 10/126* (2013.01)

(56) References Cited

U.S. PATENT DOCUMENTS

| | | |
|---|---|---|
| 8,062,081 B2 | 11/2011 | Barrett et al. |
| 8,204,977 B1 | 6/2012 | Brodersen et al. |
| 8,299,638 B2 | 10/2012 | Sandoy et al. |
| 2009/0156068 A1 | 6/2009 | Barrett et al. |
| 2012/0302112 A1 | 11/2012 | Hartig et al. |

FOREIGN PATENT DOCUMENTS

| | | |
|---|---|---|
| GB | 2445382 A | 7/2008 |
| WO | WO 2009112876 A1 | 9/2009 |
| WO | WO-2011092330 A2 | 8/2011 |

OTHER PUBLICATIONS

Written Opinion of the International Searching Authority PCT/ISA/237 for International Application No. PCT/EP2013/054611 dated May 31, 2013.
German Office Action mailed Jan. 12, 2016.
Chinese Office Action mailed Jan. 4, 2016.
Australian Office Action mailed Apr. 7, 2016.

DRIVE CASCADE SYSTEM FOR A WATERCRAFT

PRIORITY STATEMENT

This application is a divisional application of and claims priority under 35 U.S.C. §120/121 to U.S. application Ser. No. 14/382,916 filed Sep. 4, 2014, which is a national phase under 35 U.S.C. §371 of PCT International Application No. PCT/EP2013/054611 which has an International filing date of Mar. 7, 2013, which designated the United States of America, and which claims priority to German patent application number DE 10 2012 203 820.5 filed Mar. 12, 2012, the entire contents of each of which are hereby incorporated herein by reference.

FIELD

At least one embodiment of the invention generally relates to a drive method for a drive system, including at least:
  operating at least one drive propeller of the drive system below a first predefinable propeller rotational speed according to a first operating state by operating at least one drive motor, connected to the at least one drive propeller, of the drive system by way of a first alternating voltage,
  wherein according to the first operating state at least one power inverter makes available the first alternating voltage,
  operating the at least one drive propeller above the first predefinable propeller rotational speed according to a second operating state by operating the at least one drive motor by way of a second alternating voltage,
  wherein according to the second operating state a first internal combustion engine drives a first generator, which generates the second alternating voltage.

At least one embodiment of the invention generally relates to a controller and a machine with at least one drive system. Finally, at least one embodiment of the invention generally relates to a computer program and a computer program product.

BACKGROUND

Until now so-called fully electric or hybrid drive systems were used for ships, the drive systems of which have to be designed and optimized for a number of speeds or speed ranges due to their travel profile. Such drive systems generally include at least two drive motors operated independently of one another. They generally drive the ship propulsion system by way of a power transmission unit.

The power transmission unit can comprise the following components for example: a shaft system with associated bearings and a thrust bearing, a coupling between drive motor and shaft system as well as a step-down gear between drive motor and shaft system. The ship propulsion system can in particular comprise a fixed pitch propeller or a variable pitch propeller system.

In the known prior art the electric traction motors used in the fully electric or hybrid drive systems are generally supplied from a drive power system at constant voltage and frequency. To regulate the rotational speed of the electric traction motors, they are generally supplied by way of a converter which converts the fixed voltage and frequency to a variable voltage with variable frequency, which is in each instance between almost zero and a maximum voltage or maximum frequency. The logical consequence here is that all the drive power must be made available by corresponding converters and transformers. However converters and transformers represent a significant weight and volume with the consequence that for example weight-critical ship types, for example lightweight ships, could hitherto not be fitted with such drive systems.

Alternatively a ship unit system can be provided that comprises at least one generator in a drive power system and drives the ship by way of at least one electric shaft, the electric shaft being connected to a ship propulsion system and comprising at least one traction motor. The drive power system here refers to the electric power system which supplies the drive power for the ship. Two or more generators, also called drive power system generators and driven for example by diesel sets or gas turbines, are preferably used for this purpose. The traction motor comprises a jet and a propeller for example. The electric shaft refers to a fixed electric coupling between generators and drive motors, which is such that a rotational movement of the generators brings about a corresponding rotational movement of the electric drive motors. The function of a mechanical shaft is reproduced with such an electric shaft. The generators of the drive power system can be connected electrically and are matched to the traction motor(s) in respect of pole number and voltage.

The generators can be connected both to one another and also to the traction motors, provided that the respective voltages and frequencies are synchronized. A transformer with at least one converter is also connected to the drive power system, being switched both to the on board power system and to a propeller motor, the on board power system representing the residual electric power system of the ship, which supplies for example the electric power for lighting, navigation and control devices and the like. As the on board power system generally also has its own energy generation system, preferably for emergency and port operation, and is supplied for example using multifuel combustion sets and connected generators, it is also possible additionally to supply the traction motor from the on board power system up to a certain rotational speed of the traction motor. An on board power system inverter or a further power inverter can be used for this purpose, converting the on board power system voltage, an alternating voltage at constant frequency and constant amplitude, to an alternating voltage of variable frequency and variable amplitude for the operation of the traction motor. This power inverter is also referred to as a start-up converter and can in principle also be operated in the reverse manner so that the variable alternating voltage of the drive power system is converted to the on board power system voltage.

It is necessary to supply the traction motor from the on board power system, as the electric shaft cannot be operated below a certain frequency due to the idle speed of the internal combustion engines. As a result the propulsion system cannot be operated smoothly in respect of its rotational speed from the stationary state to the idle speed of the internal combustion engine using a drive system supplied exclusively by an electric shaft. This means that at idle speed when the electric shaft is activated the torque acts on the ship propulsion unit and therefore the ship's speed or the maneuverability of the ship is unsatisfactory when traveling slowly, for example during port operation and when maneuvering. It is also desirable for the torque to act constantly on the ship's propeller, which affects the switching point at idle speed with an increasing or decreasing rotational speed.

Such an alternative ship unit system as cited above is known from WO2011092330A2, wherein there is provision for a number of electric drive shafts and for drive motors to be supplied by way of the electric shafts or by way of an on board power system.

In one operating state, a drive propeller of the ship can be driven by way of at least one electric shaft, which comprises an internal combustion engine and a generator in each instance, the internal combustion engine and therefore also the drive system for the drive propeller having a minimum rotational speed in this operating state. In a different operating state, in which the propeller rotational speed is lower than this minimum rotational speed, the drive propeller can be supplied by way of the on board power system, in particular with an alternating voltage at low frequency. This allows a fixed pitch propeller to be used even when low ship speeds are desired.

SUMMARY

At least one embodiment of the invention is directed to being able to move a water craft from the stationary state to maximum speed and vice versa with continuous propulsion avoiding jerky propulsion changes while at the same time operating the individual drive components economically.

A drive method is disclosed wherein, during a transition from the first operating state to the second or vice versa, the first internal combustion engine is initially operated at such a rotational speed that the at least one drive propeller is operated at the first predefinable propeller rotational speed and the at least one power inverter synchronizes the first alternating voltage with the second alternating voltage.

A controller, a water craft, a computer program as claimed and a computer program product are also disclosed.

The existence of a number of operating states, in particular for different speed ranges, and the transition between the operating states are referred to here as a drive cascade system, as the drive power is supplied in a different manner for the respective speed range.

Synchronization of the alternating voltages of the first and second operating states used for drive purposes allows optimum maneuverability during the transition from one operating state to the other, in particular in the low speed range. While a comparable maneuvering precision is often achieved for ship drive systems simply by using variable pitch propellers, maneuvering precision becomes possible with cheaper conventional fixed pitch propellers using the inventive method, with additional redundancy advantageously being achieved at the same time. This is of particular interest for existing ship drive systems with fixed pitch propellers, which until now could only be maneuvered relatively imprecisely, particularly when mooring in or departing from port, as precise positioning is required in particular in port at low speed. By retrofitting such a water craft with device(s) required for an embodiment of the inventive method it is also possible to improve maneuverability for older water craft or water craft with fixed pitch propellers. An embodiment of the inventive method has the advantage in particular that components are used which a water craft normally has irrespective of the drive system and maneuverability can nevertheless still be improved.

According to an embodiment, the method provision is made for the water craft to be operated at very low speeds according to the first operating state, in other words using at least one power inverter. In this process the at least one power inverter can draw power, for example from an on board power system, in order thus to make available the first alternating voltage, for example using a transformer, to supply the drive motor connected to the at least one drive propeller. The on board power system can be supplied for example by a multi-fuel combustion set using LPG or LNG and a connected on board power system generator. In principle it is also conceivable for a number of drive motors each to drive at least one drive propeller. It is possible here for all the drive power to be distributed to a number of drive motors, each of which is assigned to an electric shaft, but also for just one motor to be driven in the low rotational speed range.

BRIEF DESCRIPTION OF THE DRAWINGS

The invention is described and explained in more detail below with reference to the example embodiments illustrated in the figures, in which.

DETAILED DESCRIPTION OF EXAMPLE EMBODIMENTS

Figure 1:
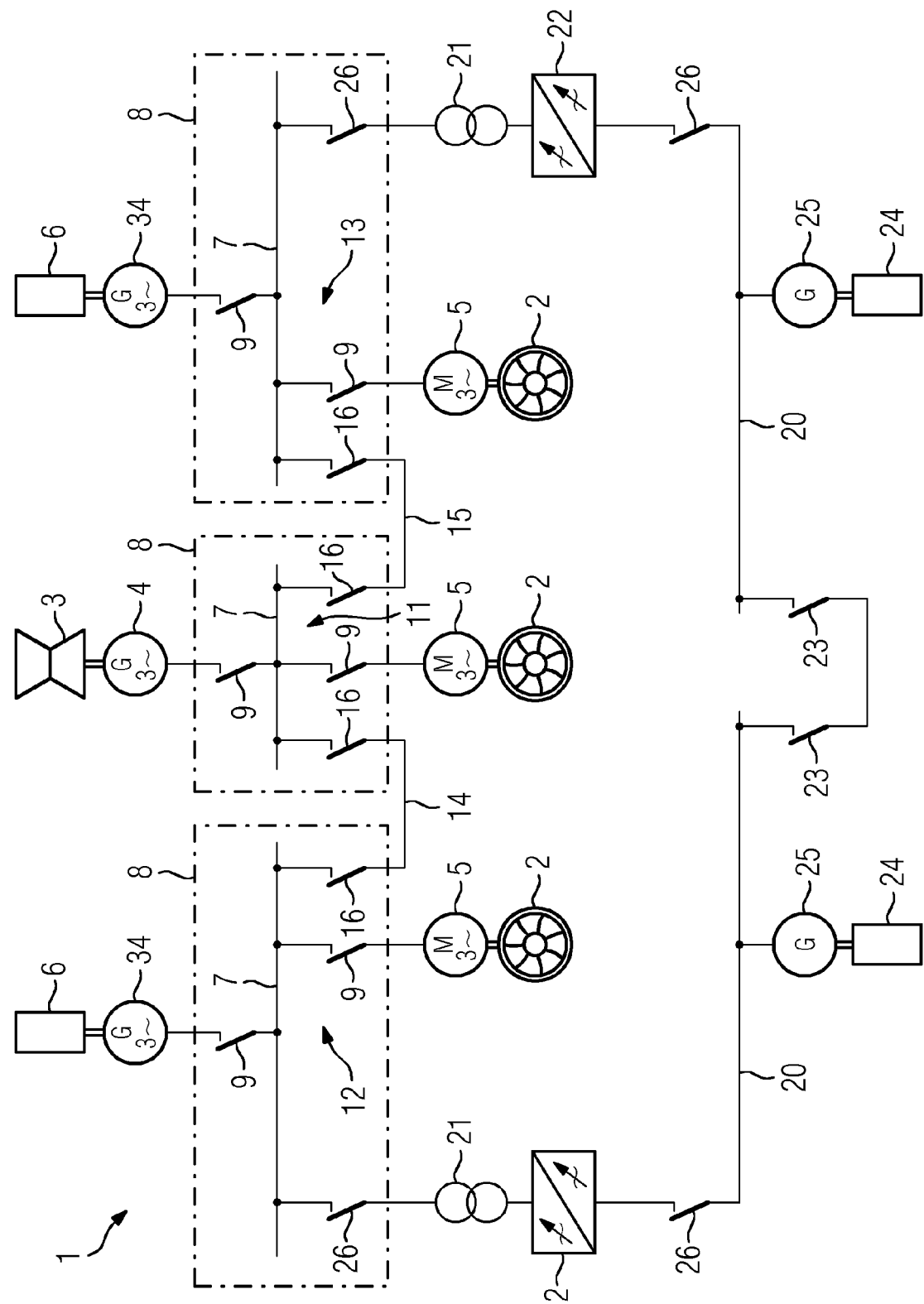
FIG. 1 shows a first example embodiment of a drive system of an inventive water craft and FIG. 2 shows an example profile of a drive cascade system as a function of a relative propeller rotational speed.

According to an embodiment, the method provision is made for the water craft to be operated at very low speeds according to the first operating state, in other words using at least one power inverter. In this process the at least one power inverter can draw power, for example from an on board power system, in order thus to make available the first alternating voltage, for example using a transformer, to supply the drive motor connected to the at least one drive propeller. The on board power system can be supplied for example by a multi-fuel combustion set using LPG or LNG and a connected on board power system generator. In principle it is also conceivable for a number of drive motors each to drive at least one drive propeller. It is possible here for all the drive power to be distributed to a number of drive motors, each of which is assigned to an electric shaft, but also for just one motor to be driven in the low rotational speed range.

As the at least one power inverter can supply alternating voltages of variable frequency, the at least one drive propeller can be moved out of the stationary state at very low propeller rotational speeds. The propeller rotational speeds can be increased continuously and smoothly from the stationary state until a first predefinable propeller rotational speed is reached, it being possible to bring about a reduction of the propeller rotational speed in the same manner.

This first predefinable propeller rotational speed can be characterized in particular by the reaching of a certain maximum power that can be drawn from the on board power system, by the minimum rotational speed of the first internal combustion engine or any rotational speed of the first internal combustion engine. The internal combustion engine can be embodied for example as a diesel engine or as a gas turbine or the like. Diesel engines or gas turbines generally have a minimum rotational speed in the order of 100 revolutions or 1000 revolutions per minute. When selecting the predefinable propeller rotational speed, it is also possible to take into account the efficiency of the internal combustion engine as a function of rotational speed in some instances.

In principle the propeller rotational speed and therefore the speed of the water craft for an operating state are limited by the maximum power of the respective drive components, for example of internal combustion engines and associated generators or power inverters. Also the power that can be spared in the on board power system can result in limitations in this respect, so these parameters have to be taken into account when carrying out this embodiment of the method. Because of their overload capacity the use of gas turbines has advantages in respect of maximum power, in particular in emergencies in which particularly high power is required or parts of the drive system have failed.

For a transition from the first operating state to the second, the first internal combustion engine is initially started and then operated at a rotational speed such that the first predefinable propeller rotational speed can be reached. Finally the at least one power inverter performs a synchronization such that the second alternating voltage made available by the first generator is maintained and the grouping of first internal combustion engine and first generator functions as master. In contrast the at least one power inverter functions as slave, in that the first alternating voltage from the at least one power inverter is adjusted based on the second alternating voltage for example in respect of frequency, phase angle and voltage amplitude, within a reasonable tolerance range, until the first generator and the at least one power inverter generate a synchronized alternating voltage. The energy supply can then transition smoothly from the at least one power inverter to the first generator. The cited dimensions of the second alternating voltage can be varied in particular by an end stage of the power inverter, which can comprise power semiconductors, which are activated in such a manner that the desired form of the second alternating voltage is generated.

After the transition the power of the on board power system can be adjusted, for example by shutting down on board power system motors, which supply the on board power system with energy by way of on board power system generators. This allows energy to be saved and the individual components of the drive system are operated close to their optimum operating state. In the first operating state and if no transition to the second operating state is anticipated, the first internal combustion engine can remain deactivated to save fuel. Because internal combustion engines can remain deactivated in the first operating state, a creep speed can be implemented at which the water craft emits only a low level of sound. To this end the power inverter can be supplied with energy for example by a battery system, a fuel cell system or an effectively encapsulated on board power system set.

The time required for synchronization can also be taken into account for the sequence of the method, so that the first internal combustion engine is started early enough to ensure a continuously increasable propeller rotational speed, even if the water craft is required to accelerate as quickly as possible. The time required is influenced for example by a time constant of the drive system, as a changed propeller rotational speed requires a certain time before it is implemented as thrust in the water. A time constant of the energy generation system should also be taken into account, as the speed with which electrical energy can be supplied by the at least one power inverter or the first generator to the at least one drive motor also plays a role. For example a diesel engine takes around 30 seconds to start up and a gas turbine around 10 seconds, a preheated and prelubricated state being assumed for a gas turbine. If the gas turbine is not yet in this state, the time it requires to become available increases, sometimes significantly. In contrast in the case of a power inverter synchronization can be performed relatively quickly, generally within a few seconds. In particular in the case of emergency maneuvers, for example an emergency stop or the need to accelerate as quickly as possible, such time constants can be used for timely synchronization so that the first internal combustion engine is started up in a timely manner.

After the transition to the second operating state the power of the drive system or the propeller rotational speed can be increased smoothly by increasing the rotational speed of the first internal combustion engine.

During a transition from the second operating state to the first the propeller rotational speed is reduced until the first internal combustion engine reaches a rotational speed which results in the first predefinable propeller rotational speed. The at least one power inverter then in turn acts as slave to perform a synchronization in such a manner that it adjusts the first alternating voltage based on the second alternating voltage, for example in respect of frequency, phase angle and voltage amplitude. After adjustment the energy supply can transition in a smooth manner from the first generator to the at least one power inverter and the first internal combustion engine can optionally be deactivated to save fuel.

The method can be used for example in passenger ships to increase traveling comfort on board. Application in submarine craft is also conceivable, allowing a creep speed to be implemented, as unnecessary vibration and shaking can be reduced using the method. The method allows the water craft to accelerate smoothly and continuously from the stationary state and to be slowed smoothly and continuously from a certain speed, it being possible to select the propeller rotational speed and the power output by the at least one drive propeller in an infinitely variable manner at all times.

The ship drive system is preferably controlled by one or more drive levers in such a manner that a controller with power management selects an optimum operating state for every ship speed or propeller rotational speed. Switching operations can be executed automatically by a control and regulation system as a function of setpoint values preset by the drive lever taking into account the method steps. The optimum operating state here is an optimum drive mode, in that an optimized number of internal combustion engines and generators of the drive power system driven therewith and propeller motors is determined and it is established whether additional power is drawn from the power inverter and on board power system. The electric drive system here is adjusted in respect of the maximum propeller rotational speed and the maximum possible torque output based on the ship propulsion system. The drive motors can output any rotational speed and torque in an infinitely variable manner below their limit characteristics in the rotational speed range between the stationary state and maximum rotational speed. During emergency maneuvers the abovementioned time constants can be pushed to the boundaries of the loading capacity of the system components, which can be particularly significant when superconducting synchronous machines are used, which have a relatively rigid current/voltage characteristic.

Application is generally advantageous for fast and light water craft, for example high-speed multihull craft such as catamarans and trimarans, as there is no need for large and powerful power inverters and transformers, in particular for middle-range and higher speeds. Such power inverters and transformers generally require a relatively large amount of space, tend to be expensive and relatively heavy so that dispensing with them has financial advantages and allows the water craft to be designed to be lighter and faster. Only the at least one power inverter of the on board power system is now also used for drive purposes in addition to its conventional areas of use. This allows low rotational speeds to be avoided for on board power system sets which drive the on board power system generators to generate energy and the on board power system sets can be operated close to their optimum operating point, thereby saving energy.

As the water craft is to be driven with the aid of the on board power system or by way of an electric shaft, the drive system has redundancy, which means that the water craft can still be maneuvered even if one of the energy generation components has technical problems. This redundancy is a major advantage, particularly in emergencies in which components of the drive system fail. Any on board power system sets present can thus be deactivated, particularly in emergencies or for example at higher speeds, as the on board power system can be supplied by way of the internal combustion engine and the generator of the electric shaft. Further energy savings can also be achieved, if the at least one drive propeller drives the drive motor as the water craft slows, with a so-called PTO (power take out) operation prevailing, as the drive motor is operated in the manner of a generator. The energy thus obtained is supplied to the on board power system by way of the power inverter. On board power system sets for supplying the on board power system can then be cut back or deactivated completely. In contrast with the other operating modes a so-called PTI (power take in) operation prevails, in other words the drive motor is operated as a motor.

In one advantageous embodiment of the invention, provision is made for the following further method step:
  operating the at least one drive propeller above a second definable propeller rotational speed, which is higher than the first predefinable propeller rotational speed, according to a third operating state by operating the at least one drive motor by way of a third alternating voltage,
  wherein according to the third operating state the first alternating voltage of the at least one power inverter in synchronized combination with the second alternating voltage produces the third alternating voltage,
  wherein during a transition from the second operating state to the third operating state the at least one drive motor is only operated by way of the third alternating voltage when the first alternating voltage is synchronized with the second alternating voltage by way of the at least one power inverter.

The transition from the second operating state to the third operating state allows higher speeds, with a practically jerk-free transition being ensured by synchronization. Synchronization takes place in a similar manner to the transition from the first operating state to the second, with the difference that in the third operating state the drive energy for the at least one drive propeller comes from both the at least one power inverter and also the first generator. The third alternating voltage results from the superimposition of the two alternating voltages with the frequency, phase angle and voltage amplitude of the first alternating voltage adjusted in relation to the second alternating voltage.

In an alternative advantageous embodiment of the invention, provision is made for the following alternative method step:
  operating the at least one drive propeller above a third predefinable propeller rotational speed, which is higher than the first predefinable propeller rotational speed, according to a fourth operating state by operating the at least one drive motor by way of a fourth alternating voltage,
  wherein according to the fourth operating state at least one further internal combustion engine drives at least one further generator in each instance, which generates a further alternating voltage in each instance, which in synchronized combination with the second alternating voltage produces the fourth alternating voltage,
  wherein during a transition from the second operating state to the fourth a respective polar wheel angle of the at least one further generator is synchronized with a first polar wheel angle of the first generator.

As each electric shaft can be designed to be very powerful, in particular compared with the power available in the on board power system, a drive system with a number of internal combustion engines and respectively connected generators allows relatively high speeds. Because of the high possible speeds and also because of the comfortable, practically jerk-free switching to a greater drive power, this embodiment is of interest particularly for fast water craft, in particular passenger ships or submarine craft.

According to this embodiment of the method, provision is made for synchronizing the individual generators, with the first generator being operated as master. The first generator has a rotor, the position of which is characterized by the polar wheel angle. The at least one further generator also has a rotor with a respective polar wheel angle in each instance. Assuming that the generators each have the same number of polar pairs, synchronization of the generators is achieved by operating the at least one further generator or the at least one further internal combustion engine at the same rotational speed as the first generator or the first internal combustion engine and also matching the respective polar wheel angles and voltage amplitudes of the generators. Once this is achieved, the further generators can be connected in a practically jerk-free manner. Should the generators each have different number of polar pairs, the method can still be carried out if the different number of polar pairs is taken into account for the respective generator frequency and the respective polar wheel angle.

For the transition to the fourth operating state the at least one further internal combustion engine is operated at a relatively high rotational speed. Additional drive power is then achieved in that at least one of the internal combustion engines tries to accelerate by way of an increased fuel supply. The polar wheel angle of the generator connected to that internal combustion engine would thus easily exceed the polar wheel angles of the other generators. As a result, that internal combustion engine takes on additional load and more power is available for the drive system as a whole. Of course the internal combustion engines can also be started up as far as possible at the same time for this purpose, until the individual internal combustion engines finally reach their respective power limits.

A transition from the fourth operating state to the second operating state is achieved by reducing the propeller rotational speed and then applying just the second alternating voltage to the at least one drive motor.

According to a further embodiment of the method, provision is also made for the following method step:
  operating the at least one drive propeller above a fourth predefinable propeller rotational speed according to a fifth operating state by operating the at least one drive motor by way of a fifth alternating voltage,
  wherein according to the fifth operating state the first alternating voltage of the at least one power inverter in synchronized combination with the fourth alternating voltage produces the fifth alternating voltage,
  wherein during a transition from the fourth operating state to the fifth operating state the at least one drive motor is only operated by way of the fifth alternating voltage when the first alternating voltage is synchronized with the third alternating voltage by way of the at least one power inverter.

By combining the power of the first internal combustion engine, the at least one further internal combustion engine and finally the at least one power inverter, the at least one drive propeller can be operated up to its maximum propeller rotational speed so that the water craft can reach its maximum speed. By switching the first alternating voltage to the fourth alternating voltage in a synchronized manner using the power inverter operated as slave the transition from the fourth operating state to the fifth operating state can also be performed in a practically jerk-free manner.

The fifth operating state can be important particularly in emergency situations in which the maximum propeller rotational speed has to be reached. The abovementioned time constants can optionally be taken into account here so that as much power as possible can be transmitted as quickly as possible to the at least one drive propeller.

The transition from the fifth operating state to the fourth operating state is preferably possible in that the at least one power inverter continuously reduces the power it supplies to the at least one drive motor, until finally no further power is transmitted.

According to a further embodiment of the method, during operation in one of the operating states, a transition is made to another operating state in the event of a failure of parts of the drive system required to generate the respective alternating voltage, with synchronization of the respective alternating voltage of the other operating state being performed taking into account the alternating voltage present at the at least one drive motor.

As mentioned above, the distribution of the drive power to a number of energy generation components and for example a number of drive propellers and drive motors has the advantage of redundancies which allow the water craft still to be able to be maneuvered even if one of the drive components has technical problems.

If one of the internal combustion engines or one of the generators fails or its power is reduced for technical reasons, a further internal combustion engine and a generator driven therewith or the at least one power inverter can be connected in a synchronized manner. The abovementioned time constants mean that switching can normally only take place after the loss of the power of the failed internal combustion engines or generator.

As soon as the failure is registered, the further internal combustion engine or optionally the on board power system set supplying the power inverter is started up to prepare for the transition to another operating state. The transition takes place as soon as soon as synchronicity of the alternating voltage generated by the started up parts of the drive system with the alternating voltage present at the at least one drive motor is achieved, with synchronicity of the alternating voltages being present when the respective frequencies, amplitudes and phase angles correspond. It can happen here, particularly if a powerful internal combustion engine has to be replaced by a relatively low-power on board power system set, that much less drive power is available.

In this instance the transition can in particular only take place after a phase in which the ship slows down and in some instances the drive propeller and drive motor are operated by turbine and is only completed when the power inverter can make available a sufficiently large amount of power which results in an appropriate propeller rotational speed. The transfer of power from power inverter to drive motor can then take place in a practically jerk-free manner.

If an on board power system set or a power inverter fails during operation in the first operating state in some circumstances it is only possible to replace the failed parts of the drive system with an internal combustion engine and the generator operated therewith. If the propeller rotational speed is relatively low, the least powerful internal combustion engine is advantageously connected, so the smoothest transition possible can take place. In this process the propeller rotational speed is taken into account in such a manner that a synchronized transition takes place above a certain predefinable propeller rotational speed. Below the certain predefinable propeller rotational speed the transition must be specifically permitted for example, as the minimum speed of the internal combustion engine means that only a relatively jerky transition can take place using the internal combustion engine and the generator driven therewith as master.

High temperature superconductor (HTSC) windings can also be used for the generators and/or drive motors. This has the advantage that the drive system has a higher power density. It is thus possible to achieve higher power in the same space, or less space is required for the same power. The use of HTSC machines also has the advantage that harmonics can be avoided in the electric drive system.

The superconductor winding can be a stator winding or a rotating rotor winding of the generator. A generator with a superconductor winding also generally has a much larger magnetic air gap between rotor and stator than a conventional generator without superconductor winding. This is primarily because the superconductor is cooled by a vacuum cryostat or similar cooling facility, the wall of which runs in the air gap.

The relatively large magnetic air gap causes the generator to have a much lower synchronous reactance than a conventional generator. This means that for the same electrical power an HTSC generator has a much more rigid current/voltage characteristic than a conventional generator.

As a result there is no drop in the voltage generated by the generator when there are load increases or surges, which is advantageous in particular in emergency situations with extreme power requirements. Voltage and frequency fluctuations in the electric shaft can be reduced as a result. This means there is no need for complex regulation for the electric shaft to stabilize the voltage of the drive shaft and the rotational speed of the drive motors or propulsion unit.

FIG. 1 shows a first example embodiment of a drive system of an inventive water craft. The drive system comprises three electric drive shafts 11, 12, 13 for driving a drive propeller 2 in each instance.

The first drive shaft 11 comprises variable rotational speed generator 4 driven by a first internal combustion engine 3 for generating a motor voltage with variable amplitude and variable frequency and a variable rotational speed drive motor 5 supplied with said motor voltage and coupled to a drive propeller 2.

The second drive shaft 12 and the third drive shaft 13 each comprise a further variable rotational speed generator 34 driven in each instance by a further internal combustion engine 6 for generating a motor voltage with variable amplitude and variable frequency and a variable rotational speed drive motor 5 supplied with said motor voltage and coupled to a drive propeller 2. The first internal combustion engine 3 and the further internal combustion engines 6 can each be embodied for example as a gas turbine or diesel engine.

In the case of the drive shafts 11, 12, 13 a generator 4, 34 and a drive motor 5 in each instance can be connected electrically to one another by way of a bus bar 7. The generators 4, 34 and drive motors 5 are connected to the bus bar 7 by way of a switch 9 in each instance. The bus bar 7 and the switches 9 are part of a switching system 8. The bus bar 7 of the first drive shaft 11 can be connected by way of a line connection 14 to the bus bar 7 of the second drive shaft 12 and by way of a line connection 15 to the bus bar 7 of the third drive shaft 13. The line connections 14, 15 are connected to the bus bars 7 by way of a switch 16 in each instance.

The first drive shaft 11 can optionally be coupled to the second and/or third drive shaft 12, 13 by way of the line connections 14, 15 and the switches 16. A further mechanical gear can also be connected between one of the generators 4, 34 and one of the internal combustion engines 3, 6. This is also conceivable between one of the drive propellers 2 and one of the drive motors 5. The drive shafts 11, 12, 13 can also comprise a number of generators and/or drive motors instead of just one generator 4 and drive motor 5 in each instance.

A power inverter 22 can also be operated in each instance by way of a transformer 21 with the variable amplitude and variable frequency voltage generated by the generators 34 of the electric drive shafts 12, 13, said power inverter 22 converting this variable voltage to a voltage with constant amplitude and constant frequency for a partial on board power system 20 in each instance. Low-voltage consumers of the ship (e.g. navigation and control devices, loudspeaker system, lighting) (not shown) are supplied from the partial on board power system 20. The partial on board power system 20 generally has a rated voltage of 400 V at a rated frequency of 50 Hz or 440 V at 60 Hz. The two partial on board power systems 20 can be coupled to one another by way of switches 23 so that both partial on board power systems 20 can be supplied even if one of the two drive shafts 12, 13 fails or is deactivated.

An additional port generator 25 driven by an on board power system set 24 in each instance serves, preferably by way of a downstream power inverter (not shown in detail), in each instance to supply a partial on board power system 20 or the coupled partial on board power systems 20 with a voltage with constant amplitude and constant frequency when the electric shafts 12, 13 are deactivated. This is the case for example when the ship is in port and no drive power is required or when all the power from the generators 4, 34 is required for the drive system. Additionally or alternatively the partial on board power systems 20 can also be supplied by a battery or by fuel cells or a battery system instead of by the port generator 25. It is also possible for all the drive power to be distributed to the three drive motors 5 of the three electric shafts 11, 12, 13.

In a first operating state, switches 26 are closed and drive power can be transmitted to the bus bar 7 from the on board power system sets 24 by way of the power inverters 22 and a transformer 7 in each instance. The drive motor 5 of the first electric shaft 11 can be driven using this power with appropriate switching.

In a second operating state, the drive motor 5 of the first electric shaft 11 is no longer supplied by way of the power inverters 22 but by way of the first internal combustion engine 3 and the generator 4 coupled thereto. To this end the switches 9 of the first electric shaft 11 are closed and the line connections 14 and 15 for example are open.

In a third operating state, the line connections 14 and 15 are closed, so that the power inverters 22 can transmit power to the drive motor 5 of the first electric shaft 11. The first electric shaft is also active, as in the second operating state, so that the first internal combustion engine 3 and the coupled generator 4 also supply the drive motor 5. This is possible because the power inverter 22 functions as slave and adjusts its output alternating voltage based on the alternating voltage of the generator 5.

In a fourth operating state, the line connections 14 and 15 are closed but the switches 26 are open. The power inverters 22 therefore do not contribute to the drive power. The switches 9 of the two electric drive shafts 12 and 13 are closed, so the further internal combustion engines 6 can transfer drive power by way of the bus bar 7 to the drive motor 5 of the first electric shaft 11 by way of the generators 34. This allows high propeller rotational speeds with high torque.

For the fifth operating state, starting from the fourth operating state, the switches 26 are closed so that the power inverters 22 also transmit electric power to the bus bars 7.

Figure 2:
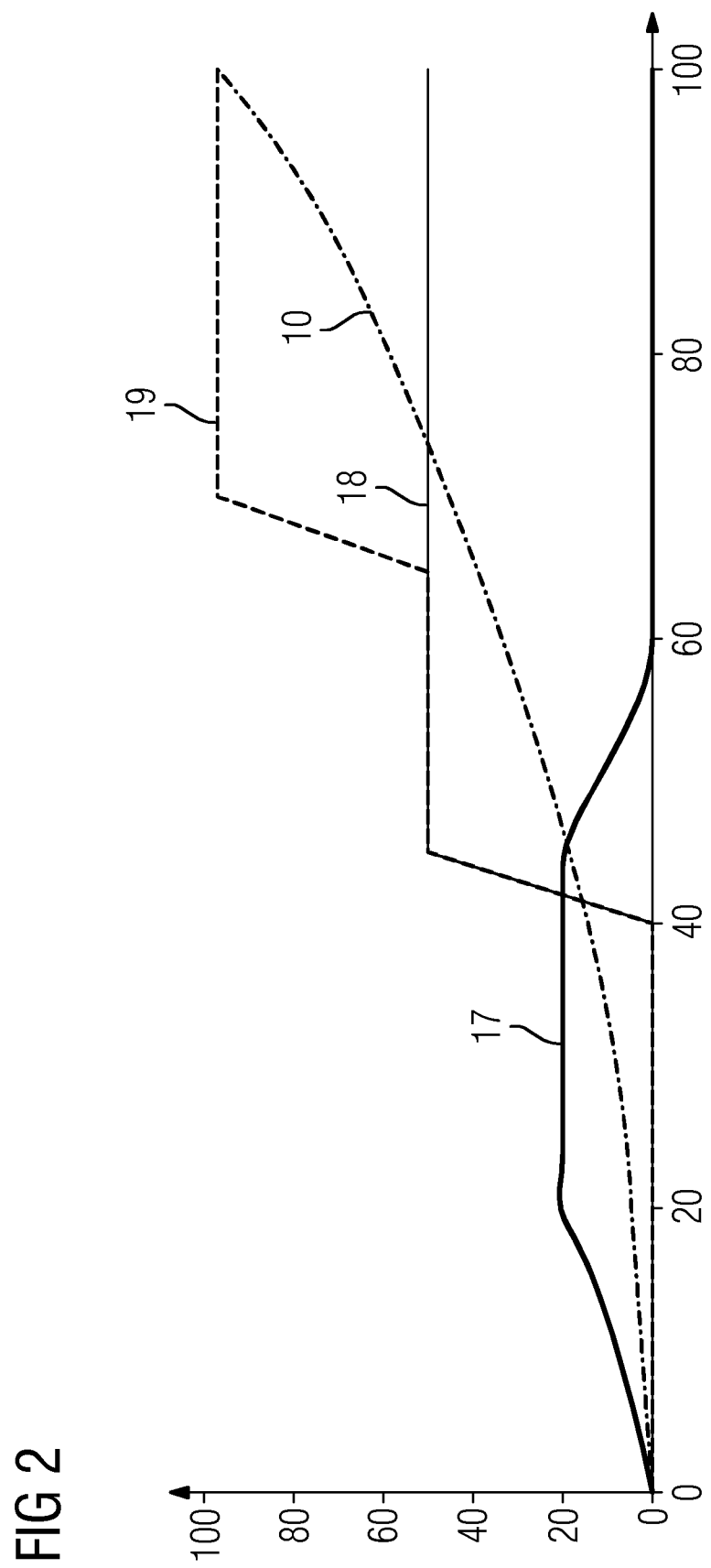

FIG. 2 shows an example profile of a drive cascade system as a function of a relative propeller rotational speed. As the propeller rotational speed increases, the rotational speed-dependent propeller power 10 required for this rises continuously, with both the propeller rotational speed and the propeller power being set in relation to the maximum dimension in each instance. Thus for the maximum propeller rotational speed of 100% the propeller power is also at a maximum and assumes the value of 100%, reference being made to the maximum dimensions for continuous operation. However short-term operation at more than 100% is also conceivable with gas turbines in particular, this being due to their overload capacity and being able to be employed during emergency maneuvers.

The drive cascade system, in an embodiment, only uses the relatively small available power 17 of a power inverter, which can bring about up to 20% of the maximum propeller power, for propeller rotational speeds lower than 40%. More powerful drive units, such as gas turbines or large diesel engines, can remain deactivated so that the respective components can be operated close to the optimum operating point and energy is saved.

For middle-range propeller rotational speeds in the region of 45% to 75% of the maximum propeller rotational speed a first electric shaft, which can comprise a gas turbine for example, supplies the available power 18. The power inverter can now be deactivated or can be operated totally according to the requirements of the on board power system, as the first electric shaft alone can provide up to 50% of the maximum propeller power. The available power 17 of the power inverter can correspondingly be cut back to zero at middle-range propeller rotational speeds.

A number of electric shafts are finally used for high propeller rotational speeds from 65% of the maximum propeller rotational speed. The available power 19 of the electric shafts is sufficient to be able to bring about the maximum propeller rotational speed.

As is clearly shown, during switching at increasing propeller rotational speed the first or more than one electric shafts are started early enough in order to take account of the above-mentioned time constant. Timely synchronization also takes place when the propeller rotational speed drops, for example in that the power inverter increases its available power 17 in a timely manner. There is therefore sufficient time to synchronize the drive power and alternating voltage, allowing a practically jerk-free, continuous acceleration or slowing profile. This is advantageous during low-speed maneuvers.

In addition to the drive cascades shown, further stages can also be implemented, by switching the power inverter to an electric shaft to allow a greater middle-range propeller rotational speed. The power inverter can also be switched to the more than one electric shafts to achieve an even greater maximum power of the drive system. This can be particularly advantageous in emergency situations in which it is necessary to accelerate or slow down as quickly as possible.

To summarize, an embodiment of the invention relates to a drive method for a drive system with provision for
  operating at least one drive propeller of the drive system below a first predefinable propeller rotational speed according to a first operating state by operating at least one drive motor, connected to the at least one drive propeller, of the drive system by way of a first alternating voltage, wherein according to the first operating state at least one power inverter makes available the first alternating voltage, operating the at least one drive propeller above the first predefinable propeller rotational speed according to a second operating state by operating the at least one drive motor by way of a second alternating voltage, wherein according to the second operating state a first internal combustion engine drives a first generator, which generates the second alternating voltage.

In order to be able to move a water craft from the stationary state to maximum speed and vice versa with continuous propulsion avoiding jerky propulsion changes while at the same time operating the individual drive components economically, it is proposed that during a transition from the first operating state to the second or vice versa the first internal combustion engine is initially operated at such a rotational speed that the at least one drive propeller is operated at the first predefinable propeller rotational speed and the at least one power inverter synchronizes the first alternating voltage with the second alternating voltage.

The invention claimed is:

1. A controller for a water craft including at least one drive system, the controller being configured to:
   operate at least one drive propeller of the drive system below a first predefinable propeller rotational speed according to a first operating state by operating at least one drive motor, connected to the at least one drive propeller, of the drive system via a first alternating voltage, wherein according to the first operating state, at least one power inverter makes the first alternating voltage available;
   operate the at least one drive propeller above the first predefinable propeller rotational speed according to a second operating state by operating the at least one drive motor via a second alternating voltage, wherein according to the second operating state, a first internal combustion engine drives a first generator, which generates the second alternating voltage; and
   initially operate the first internal combustion engine, during a transition from the first operating state to the second or a transition from the second operating state to the first, at a rotational speed where the at least one drive propeller is operated at the first predefinable propeller rotational speed and where the at least one power inverter synchronizes the first alternating voltage with the second alternating voltage.

2. A water craft, comprising:
   at least one drive system; and
   the controller of claim 1.

3. A controller for a water craft including at least one drive system, the controller comprising at least one device, configured to
   operate at least one drive propeller of the drive system below a first predefinable propeller rotational speed according to a first operating state by operating at least one drive motor, connected to the at least one drive propeller, of the drive system via a first alternating voltage, wherein according to the first operating state, at least one power inverter makes the first alternating voltage available;
   operate the at least one drive propeller above the first predefinable propeller rotational speed according to a second operating state by operating the at least one drive motor via a second alternating voltage, wherein according to the second operating state, a first internal combustion engine drives a first generator, which generates the second alternating voltage; and
   initially operate the first internal combustion engine, during a transition from the first operating state to the second or a transition from the second operating state to the first, at a rotational speed where the at least one drive propeller is operated at the first predefinable propeller rotational speed and where the at least one power inverter synchronizes the first alternating voltage with the second alternating voltage.

4. A water craft, comprising:
   at least one drive system; and
   the controller of claim 3.

5. A controller for a water craft including at least one drive system, the controller comprising:
   means for operating at least one drive propeller of the drive system below a first predefinable propeller rotational speed according to a first operating state by operating at least one drive motor, connected to the at least one drive propeller, of the drive system via a first alternating voltage, wherein according to the first operating state, at least one power inverter makes the first alternating voltage available;
   means for operating the at least one drive propeller above the first predefinable propeller rotational speed according to a second operating state by operating the at least one drive motor via a second alternating voltage, wherein according to the second operating state, a first internal combustion engine drives a first generator, which generates the second alternating voltage; and
   means for initially operating the first internal combustion engine, during a transition from the first operating state to the second or a transition from the second operating state to the first, at a rotational speed where the at least one drive propeller is operated at the first predefinable propeller rotational speed and where the at least one power inverter synchronizes the first alternating voltage with the second alternating voltage.

6. A water craft, comprising:
   at least one drive system; and
   the controller of claim 5.

7. The controller of claim 1, wherein the controller is further configured to:
   operate the at least one drive propeller above a second definable propeller rotational speed, relatively higher than the first predefinable propeller rotational speed, according to a third operating state by operating the at least one drive motor via a third alternating voltage,
   wherein, according to the third operating state, the first alternating voltage of the at least one power inverter, in synchronized combination with the second alternating voltage, produces the third alternating voltage, and
   wherein, during a transition from the second operating state to the third operating state, the at least one drive motor is only operated via the third alternating voltage when the first alternating voltage is synchronized with the second alternating voltage via the at least one power inverter.

8. The controller of claim 1, wherein the controller is further configured to:
   operate the at least one drive propeller above a third predefinable propeller rotational speed, relatively higher than the first predefinable propeller rotational speed, according to a fourth operating state by operating the at least one drive motor via a fourth alternating voltage,
   wherein, according to the fourth operating state, each at least one further internal combustion engine drives each respective at least one further generator, each of which generates a further respective alternating voltage, which in synchronized combination with the second alternating voltage produces the fourth alternating voltage, and wherein, during a transition from the second operating state to the fourth, a respective polar wheel angle of the at least one further generator is synchronized with a first polar wheel angle of the first generator.

9. The controller of claim 8, wherein the controller is further configured to:

operate the at least one drive propeller above a fourth predefinable propeller rotational speed according to a fifth operating state by operating the at least one drive motor via a fifth alternating voltage, wherein, according to the fifth operating state, the first alternating voltage of the at least one power inverter, in synchronized combination with the fourth alternating voltage, produces the fifth alternating voltage, and wherein, during a transition from the fourth operating state to the fifth operating state, the at least one drive motor is only operated via the fifth alternating voltage when the first alternating voltage is synchronized with the third alternating voltage via the at least one power inverter.

10. The controller of claim 1, wherein, during operation in one of the operating states, a transition is made to another of the operating states in the event of a failure of parts of the drive system required to generate the respective alternating voltage, with synchronization of the respective alternating voltage of the other of the operating states being performed, taking into account the alternating voltage present at the at least one drive motor.

11. The controller of claim 1, wherein the controller is further configured to:

operate the at least one drive propeller above a second definable propeller rotational speed, relatively higher than the first predefinable propeller rotational speed, according to a third operating state by operating the at least one drive motor via a third alternating voltage, wherein, according to the third operating state, the first alternating voltage of the at least one power inverter, in synchronized combination with the second alternating voltage, produces the third alternating voltage, and wherein, during a transition from the second operating state to the third operating state, the at least one drive motor is only operated via the third alternating voltage when the first alternating voltage is synchronized with the second alternating voltage via the at least one power inverter.

12. The controller of claim 5, wherein the controller further comprises:

means for operating the at least one drive propeller above a third predefinable propeller rotational speed, relatively higher than the first predefinable propeller rotational speed, according to a fourth operating state by operating the at least one drive motor via a fourth alternating voltage, wherein, according to the fourth operating state, each at least one further internal combustion engine drives each respective at least one further generator, each of which generates a further respective alternating voltage, which in synchronized combination with the second alternating voltage produces the fourth alternating voltage, and wherein, during a transition from the second operating state to the fourth, a respective polar wheel angle of the at least one further generator is synchronized with a first polar wheel angle of the first generator.

13. The controller of claim 12, wherein the controller further comprises:

means for operating the at least one drive propeller above a fourth predefinable propeller rotational speed according to a fifth operating state by operating the at least one drive motor via a fifth alternating voltage, wherein, according to the fifth operating state, the first alternating voltage of the at least one power inverter, in synchronized combination with the fourth alternating voltage, produces the fifth alternating voltage, and wherein, during a transition from the fourth operating state to the fifth operating state, the at least one drive motor is only operated via the fifth alternating voltage when the first alternating voltage is synchronized with the third alternating voltage via the at least one power inverter.

14. The controller of claim 5, wherein, during operation in one of the operating states, a transition is made to another of the operating states in the event of a failure of parts of the drive system required to generate the respective alternating voltage, with synchronization of the respective alternating voltage of the other of the operating states being performed, taking into account the alternating voltage present at the at least one drive motor.

* * * * *